United States Patent [19]

Iverson

[11] 3,997,274
[45] Dec. 14, 1976

[54] SEALED ACCESS FOR HINGE PIN LUBRICATION

[75] Inventor: Lowell P. Iverson, Aurora, Ill.

[73] Assignee: Caterpillar Tractor Co., Peoria, Ill.

[22] Filed: Apr. 5, 1976

[21] Appl. No.: 673,507

[52] U.S. Cl. .................................. 403/10; 403/38; 308/109; 403/14

[51] Int. Cl.² ...................... B25G 3/00; F16D 1/00; F16G 11/00

[58] Field of Search ................. 403/37, 38, 39, 15, 403/14, 356, 368, 370, 10; 184/105 R, 105 B, 105 C; 308/18, 19, 20, 103, 109

[56] References Cited

UNITED STATES PATENTS

| 905,019 | 11/1908 | Swanson | 403/39 X |
|---|---|---|---|
| 1,176,215 | 3/1916 | Griffin | 403/14 X |
| 2,283,871 | 5/1942 | Norelius | 308/109 |
| 2,574,773 | 11/1951 | Bannister | 403/37 |
| 2,614,006 | 10/1952 | Bechman | 308/109 |
| 2,690,933 | 10/1954 | Bechman | 308/109 X |
| 3,554,588 | 1/1971 | Reinsma et al. | 403/38 X |
| 3,841,711 | 10/1974 | Shankwitz et al. | 403/370 X |

FOREIGN PATENTS OR APPLICATIONS 1,400,764  4/1965  France ................. 403/356

*Primary Examiner*—Wayne L. Shedd
*Attorney, Agent, or Firm*—Wegner, Stellman, McCord, Wiles & Wood

[57] ABSTRACT

A hinge pin construction including a pin adapted to journal an arm or the like, an annular wedge member associated with one end of the pin, an axially extending lubricant passage in at least one of the wedge member and the pin for directing lubricant to the interface of the pin and an arm journalled thereon, a plug removably closing the axially outer end of the passage and a collet received on the wedge member and including a bolt securing the collet to the pin. An axially extending passage is located in the collet and is of a size greater than that of the plug whereby the plug may be removed from the lubricant passage. An additional plug is employed for selectively closing the collet passage and a keying device is employed for precluding assembly of the collet to the wedge member except with the collet and lubricating passages aligned to allow the introduction of lubricant into the lubricant passage without removing the collet.

7 Claims, 8 Drawing Figures

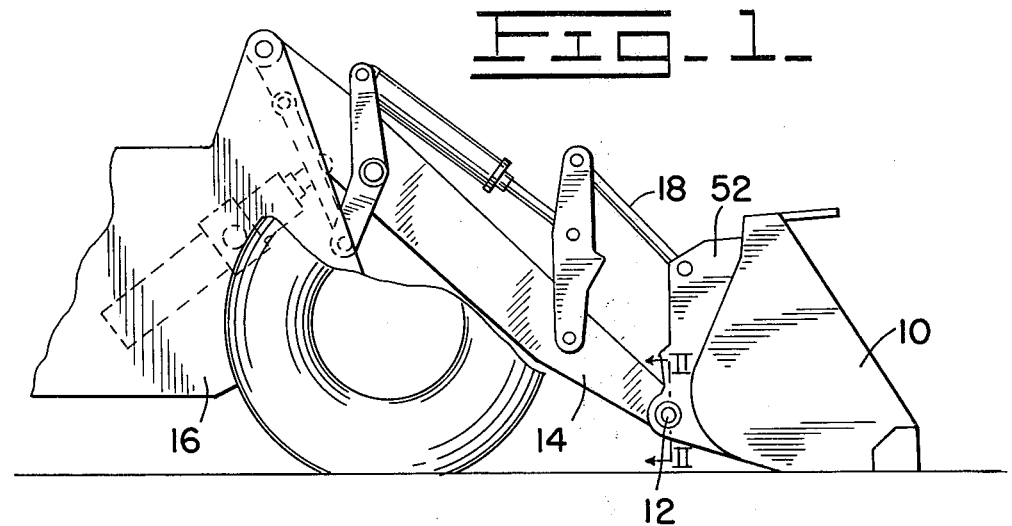
Fig_1_
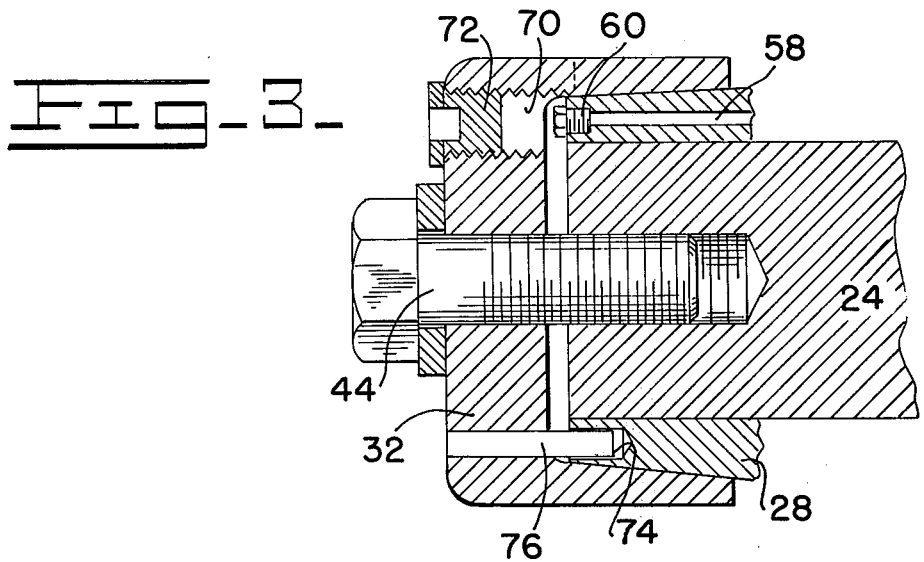
Fig_3_
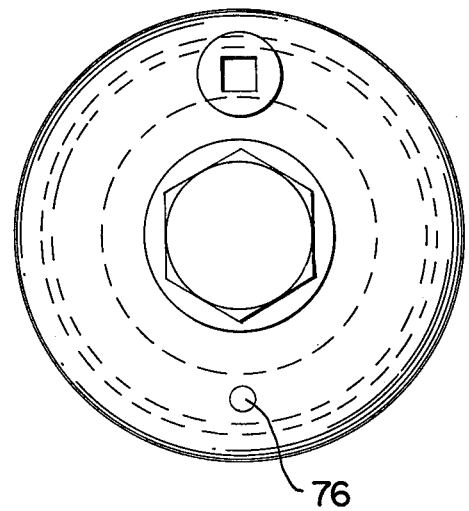
Fig_3a_

SEALED ACCESS FOR HINGE PIN LUBRICATION

BACKGROUND OF THE INVENTION

This invention relates to hinge pin constructions and, more specifically, to improved lubrication systems in hinge pin constructions.

Many hinge pin constructions, such as those used to journal a bucket to a lift arm in a front end loader or the like, employ pins with annular wedge members disposed at both ends thereof to be received in collets which in turn are frictionally held in apertured ears or the like of one of the members being journalled to another. Heretofore, lubricant has been directed to the interface of the hinge pin and the member journalled thereon through one or more axially extending passages in the wedge member, the pin, or both, which passages are closed at their axially outer end by plugs or the like.

Such plugs have been disposed within the collets and therefore are not accessible to readily permit the addition of lubricant when necessary without removal of the collets. Since the collets are frictionally wedged within an aperture, removal can be a time-consuming operation. Moreover, when removal for lubrication purposes is required, there is the additional time-consuming operation of replacement of the collets.

SUMMARY OF THE INVENTION

It is a principal object of the invention to provide a new and improved hinge pin construction. More specifically, it is an object of the invention to provide improved lubrication means in a hinge pin construction wherein time-consuming collet removal and replacement is avoided when it is necessary to replenish lubricant.

An exemplary embodiment of the invention achieves the foregoing object in a hinge pin construction including a pin adapted to journal an arm or the like, an annular wedge member associated with one end of the pin, an axially extending lubricant passage in at least one of the wedge member and the pin for directing a lubricant to the interface of the pin and an arm journalled thereon, a plug removably closing the axially outer end of the passage and a collet received on the wedge member and including means securing the collet to the pin. The inventive structure includes an axially extending passage in the collet aligned with the lubricant passage and of a size greater than that of the plug whereby the plug may be removed from the lubricant passage through the collet passage to allow the introduction of lubricant into the lubricant passage without removing the collet from the wedge member.

In a preferred embodiment, keying means are provided for precluding assembly of the collet onto the wedge member except with the collet and lubricant passages aligned.

A preferred embodiment also contemplates the provision of an additional plug for selectively closing the collet passage. Where such an additional plug is used, one embodiment contemplates the use of a bolt for securing the collet to the pin and having a head overlying the additional plug for retention purposes.

One embodiment of the invention contemplates the location of the lubricant passage in both the wedge member and the pin wherein the wedge member and pin are separate from each other. Axially extending bores are disposed in both the wedge member and the pin and the bore in the pin is aligned with the collet passage. A radially extending bore extends from the bore in the pin to the periphery of the pin and an annular peripheral groove on the interior of the wedge member is alignable with the radial bore and in fluid communication with the axial bore and the wedge member.

Other objects and advantages will become apparent from the following specification taken in conjunction with the accompanying drawings.

DESCRIPTION OF THE DRAWINGS

FIG. 1 is a fragmentary side elevation of a vehicle, such as a front end loader, which may employ a hinge pin made according to the invention;

FIG. 3 is an enlarged sectional view of one end of a hinge pin construction made according to the invention;

FIG. 3A is an elevational view taken from the left of FIG. 3;

DESCRIPTION OF THE PREFERRED EMBODIMENTS

Figure 2:
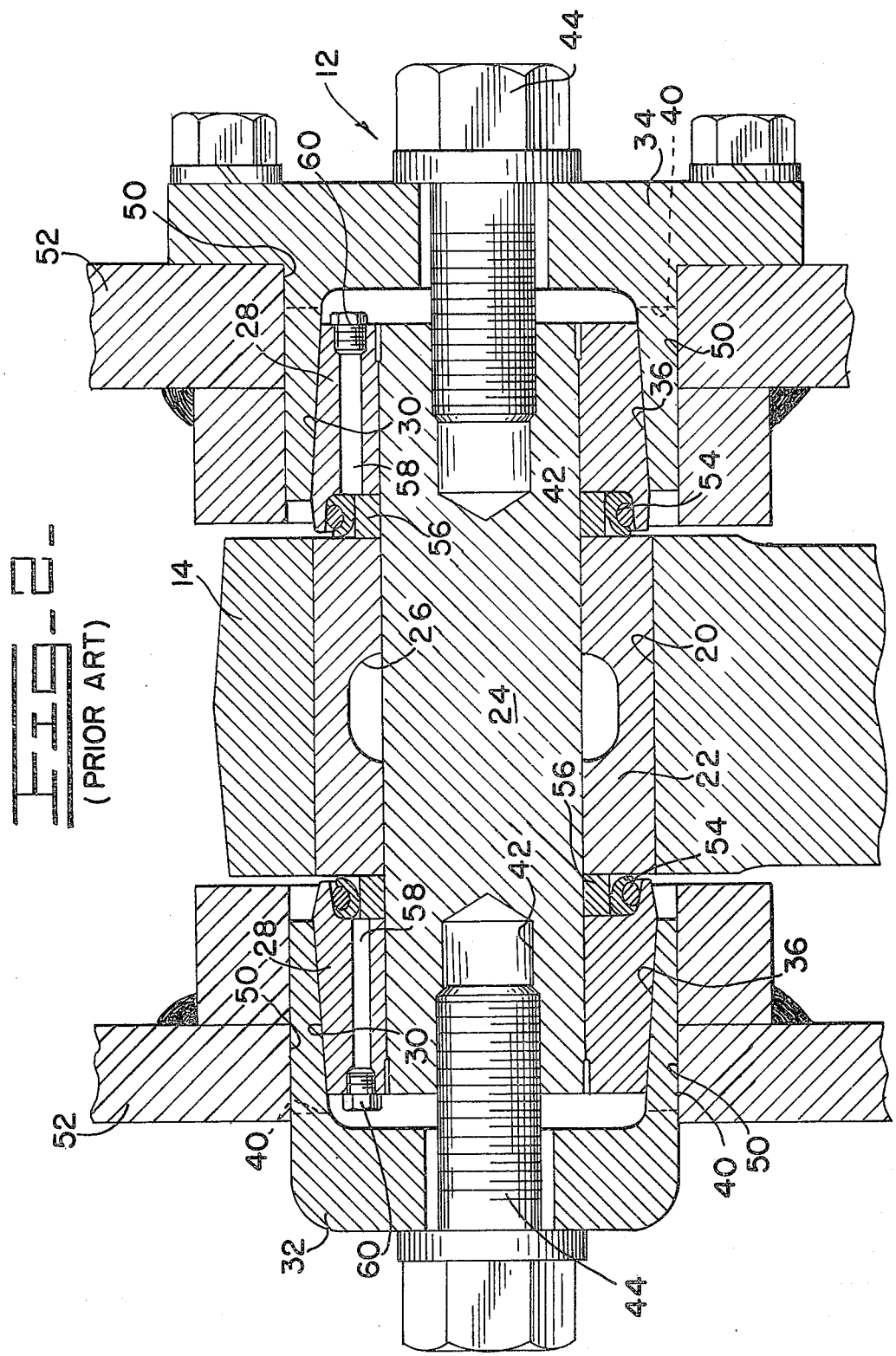
FIG. 2 is an enlarged sectional view of a conventional or prior art hinge pin construction and is taken approximately along the line 2—2 of FIG. 1.

A typical use of a hinge pin construction made according to the invention is illustrated in connection with a front end loader illustrated in FIG. 1. The front end loader includes a bucket 10 pivoted at 12 by means of a hinge pin construction to lift arms 14 which may be hydraulically operated and which are mounted on a vehicle 16. A tilt arm 18 is pivotally connected to the bucket 10 remote from the pivot 12 whereby selective pivoting of the bucket 10 about the horizontal axis of the pivot 12 may be effected in a conventional fashion.

Turning to FIG. 2, a typical prior art construction of the hinge pin 12 will be described in greater detail. Specifically, each arm 14 includes a bore 20 for receipt of a bushing 22 whereby each arm 14 is journalled about a pin 24. An annular, interiorly opening lubricant receiving groove 26 may be provided in the bushing 22. At each end, the pin 24 mounts an annular wedge member 28 having a radially inwardly tapered outer surface 30 which receives a collet 32 or a collet 34, as the case may be.

Each collet 32 includes a wedge surface 36 adapted to cooperate with the inclined wedge surface 30 on the associated wedge member 28 and a plurality of axially extending grooves, the ends of which are shown in dotted line at 40.

Each end of the pin 24 is provided with a tapped bore 42 for receipt of a bolt 44 and extending through the associated collet. As a consequence, tightening each of the bolts 44 will urge the associated collet 32 or 34 axially inwardly against the associated wedge member 28 with the result that the collet will be tightly frictionally wedged within a collet receiving opening 50 in, for example, ears 52 on the rear side of the bucket 10.

Each of the collets 28, adjacent its axially inner surface, is provided with a grease seal 54 of conventional construction which bears against the adjacent side of the bushing 22. An annular collar 56 radially inwardly of each grease seal 54 may be provided for positioning purposes. Each collet 28 also includes an axially extending lubricant receiving passage 58 whereby a lubricant, such as a grease, may be directed to the interface between the grease seal 54 and the sleeve 56 to the interface of the bushing 22 and the pin 24 and, ultimately, to the groove 26 to lubricate the pivotal connection provided by the various components. Preferably, each passage 58, at its axially outer end, and within the associated collet 32 or 34, is provided with a removable, tapped plug 60 to prevent unwanted entry of foreign material into the lubricant receiving passages 58.

As can be appreciated from an inspection of FIG. 2, replenishment of a lubricant in the passages 58 is a difficult procedure requiring firstly, the removal of the bolts, and then the extraction of the associated collet 32 or 34 which is frictionally wedged in the associated one of the openings 50 and may require the use of a pulling tool for removal. The plugs 60 may be removed and lubricant introduced into the passages 58. Upon completion of the replenishment operation, the plugs 60 are replaced, as are the collets 32, and then the bolts 44 tightened to restore the collets to the position illustrated in FIG. 2.

Much of the difficulty attendant the preceding procedure is avoided in hinge pin constructions made according to the present invention. FIGS. 3 and 3A illustrate one embodiment of an inventive hinge pin construction and where components similar or identical to those employed in the prior art construction are used, they will be given the same reference numerals.

In the embodiment illustrated in FIG. 3, the wedge member 28 is provided with the lubricant passage 58 as well as the plug 60, although the plug 60 employed in the embodiment of FIGS. 3 and 3A may be somewhat reduced in diameter from that illustrated in connection with the prior art construction.

The collet 32 (or the collet 34) is provided with an axially extending passage 70 which is alignable with lubricant passage 58 and which may receive a threaded plug 72 for closing the same. The collet passage 70 is larger than the plug 60 so as to allow removal of the plug 60 through the passage 70 after the plug 72 has been removed. Thus, lubricant may be directed to the passage 58 by the simple procedure of removing the plugs 60 and 72 without removing the collet 32 from the associated wedge member 28.

Preferably, the wedge member 28 is provided with a bore 74 at any desired location angularly spaced from the passage 58 for receipt of a pin 76 carried by the collet 32. The bore 74 and pin 76 are oriented with respect to each other and to the passages 58 and 70 such that the collet 32 cannot be assembled to the wedge member 28 in any configuration except the one whereat the passages 58 and 70 are aligned with each other. Thus, the bore 74 and the pin 76 serve as a keying means to ensure such alignment.

Figure 4:
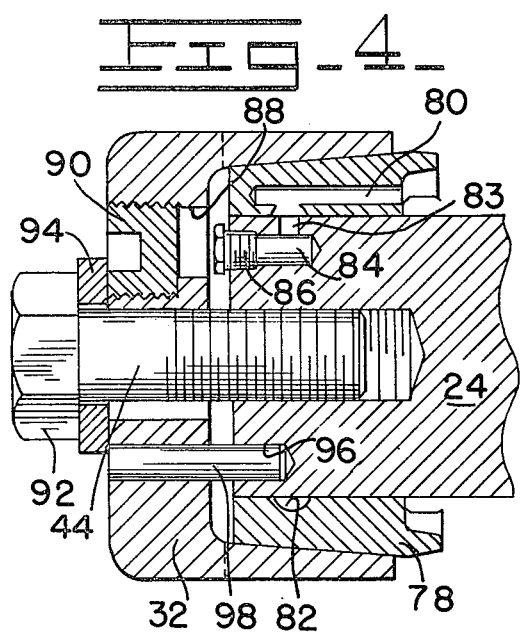
FIG. 4 is a view similar to FIG. 3 but of a modified embodiment of the invention.
Figure 4A:
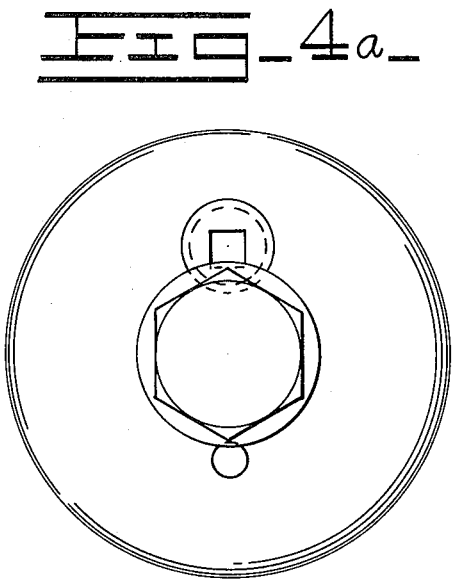
FIG. 4A is an elevational view taken from the left of FIG. 4.

FIGS. 4 and 4A illustrate a further modified embodiment of the invention and, again, where like or identical elements are employed, they are given the same reference numerals.

In the embodiment of FIG. 4, the wedge member 28 is provided with an axially extending lubricant receiving passage 80 which terminates short of the axially outer end of the wedge member 28. An annular, inwardly opening groove 82 on the interior of the wedge member 28 is in fluid communication with the passage 80 and is alignable with a radially extending bore 83 in the pin 24 which opens at the periphery of the pin 24 and extends to an axially extending bore 84. The bore 84 is also a lubricant receiving bore and includes a removable, tapped plug 86.

The collet 32 (or the collet 34) is provided with a tapped bore 88 aligned with the bore 84 and which may be closed by a removable plug 90. The bore 88 is larger than the plug 86 so that the latter can be removed through the former in the same manner as the plug 60 may be removed through the passage 70.

In the embodiment illustrated in FIG. 4, the collet bore 88 is located somewhat radially inwardly of the corresponding position of the collet bore 70 and the plug 90 is configured to be flush with the axially outer end of the collet 32 when fully disposed in the bore 88. The purpose of this construction is to allow the head 92 of the bolt 44 or a washer 94 carried thereby to overlie the plug 90 to thereby prevent inadvertent loosening and loss of the plug 90 which could result in the entry of foreign material, such as abrasive material, to the interior of the construction. Thus, the embodiment of FIG. 4 requires not only the removal of two plugs, but the removal of the bolt 44 as well to provide replenishment of the lubricant in the passages 80 and 84. However, it provides the additional feature of preventing inadvertent loss of the plug 90.

Like the embodiment illustrated in FIGS. 3 and 3A, keying means for preventing the application of the collet 32 to the wedge member 28 in all but the proper position whereat the bores 84 and 88 are aligned is provided. In the case of the embodiment illustrated in FIGS. 4 and 4A, the pin 24 is provided with a bore 96 for receipt of a pin 98 carried by the collet 32.

Figure 5:
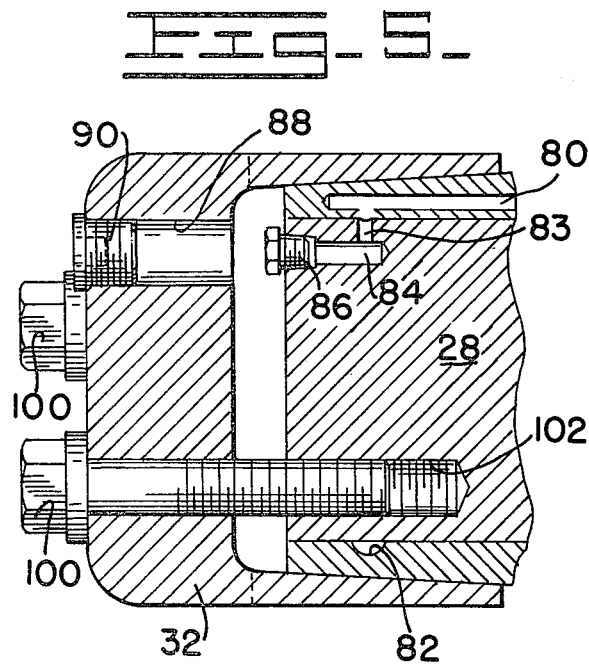
FIG. 5 is a view similar to FIGS. 3 and 4 but of still a further modified embodiment of the invention.
Figure 5A:
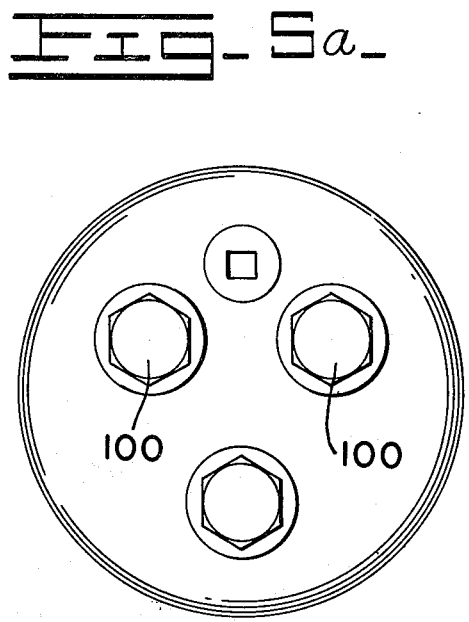
FIG. 5A is an elevational view taken from the left of FIG. 5.

FIGS. 5 and 5A illustrate an embodiment of the invention generally similar to that illustrated in FIG. 4 with the exception that three bolts 100 receivable in corresponding tapped bores 102 in the pin 28 are employed in lieu of the single bolt 44 in FIG. 4. According to this embodiment, no provision is made for positive retention of the plug 90. Additionally, no individual keying elements are employed. Rather, if keying is desired, it can be achieved by appropriately locating the centerlines of the bores 102 so as to permit installation of the collet 32 (or the collet 34) only in one position, which position will result in the passages 84 and 88 being in alignment with each other. One such configuration would be to locate the centers of the bores 102 on the apices of an isosceles triangle.

In the embodiment illustrated in FIGS. 5 and 5A, to replenish the lubricant in the passage 80, it is only necessary to remove the plug 90 and then remove the plug 86 through the passage 88 and introduce lubricant into the passage 84.

From the foregoing, it will be appreciated that a hinge pin construction made according to the invention is easily serviced in terms of replenishing lubricant without the need for removing and replacing collets or the use of special tools that may be required by reason of the tight frictional wedging action present when the collets are installed.

I claim:
1. In a hinge pin construction including a pin adapted to journal an arm or the like, an annular wedge member associated with one end of the pin, an axially extending lubricant passage in at least one of said wedge member and said pin for directing a lubricant to the interface of the pin and an arm journalled thereon, a plug removably closing the axially outer end of the passage and a collet received on said wedge member and including means securing the collet to the pin, the improvement including an axially extending passage in said collet, an additional plug for selectively closing said collet passage, and keying means for precluding assembly of said collet to said wedge member except with said collet lubricant passages aligned.

2. In a hinge pin construction including a pin adapted to journal an arm or the like, an annular wedge member associated with one end of the pin, an axially extending lubricant passage in at least one of said wedge member and said pin for directing a lubricant to the interface of the pin and an arm journalled thereon, a plug removably closing the axially outer end of the passage and a collet received on said wedge member and including means securing the collet to the pin, the improvement including an axially extending passage in said collet, and keying means for precluding assembly of said collet to said wedge member except with said collet and lubricant passages aligned; whereby lubricant may be directed to said lubricant passage through said collet passage without removing said collet.

3. In a hinge pin construction including a pin adapted to journal an arm or the like, an annular wedge member associated with one end of the pin, an axially extending lubricant passage in at least one of said wedge member and said pin for directing a lubricant to the interface of the pin and an arm journalled thereon, a plug removably closing the axially outer end of the passage and a collet received on said wedge member and including means securing the collet to the pin, the improvement including an axially extending passage in said collet aligned with said lubricant passage and of a size greater than said plug whereby said plug may be removed from said lubricant passage through the collet passage to allow the introduction of lubricant into said lubricant passage without removing said collet.

4. The hinge pin construction of claim 3 wherein said wedge member is separate from and disposed about said pin, and said lubricant passage includes axially extending bores in both said wedge member and said pin, the bore in said pin being aligned with said collet passage, a radially extending bore extending from said pin bore to the periphery of said pin; and an annular, peripheral groove on the interior of said wedge member alignable with said radial bore and in fluid communication with said wedge member axial bore.

5. The hinge pin construction of claim 4 wherein said means securing the collet to the pin comprises a plurality of bolts extending through said collet and received in tapped bores in said pin.

6. A hinge pin construction according to claim 4 further including keying means for precluding assembly of said collet to said wedge member except with said collet passage and said pin axial bore aligned.

7. The hinge pin of claim 3 further including an additional plug for selectively closing said collet passage, and wherein said securing means comprises a bolt extending through said collet and received in a threaded bore within said pin, said bolt having a head overlying said additional plug.

* * * * *